Figure 5:
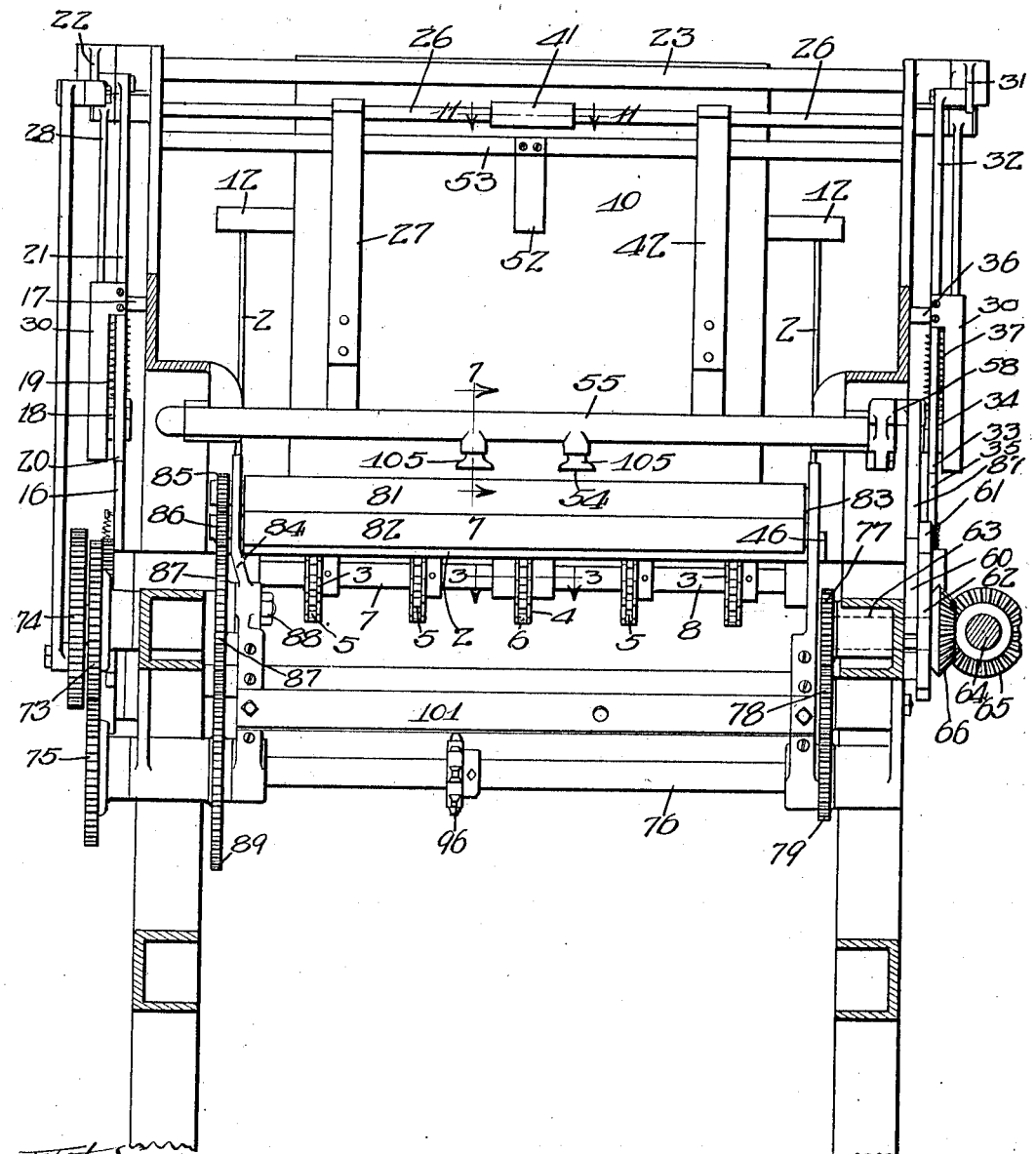

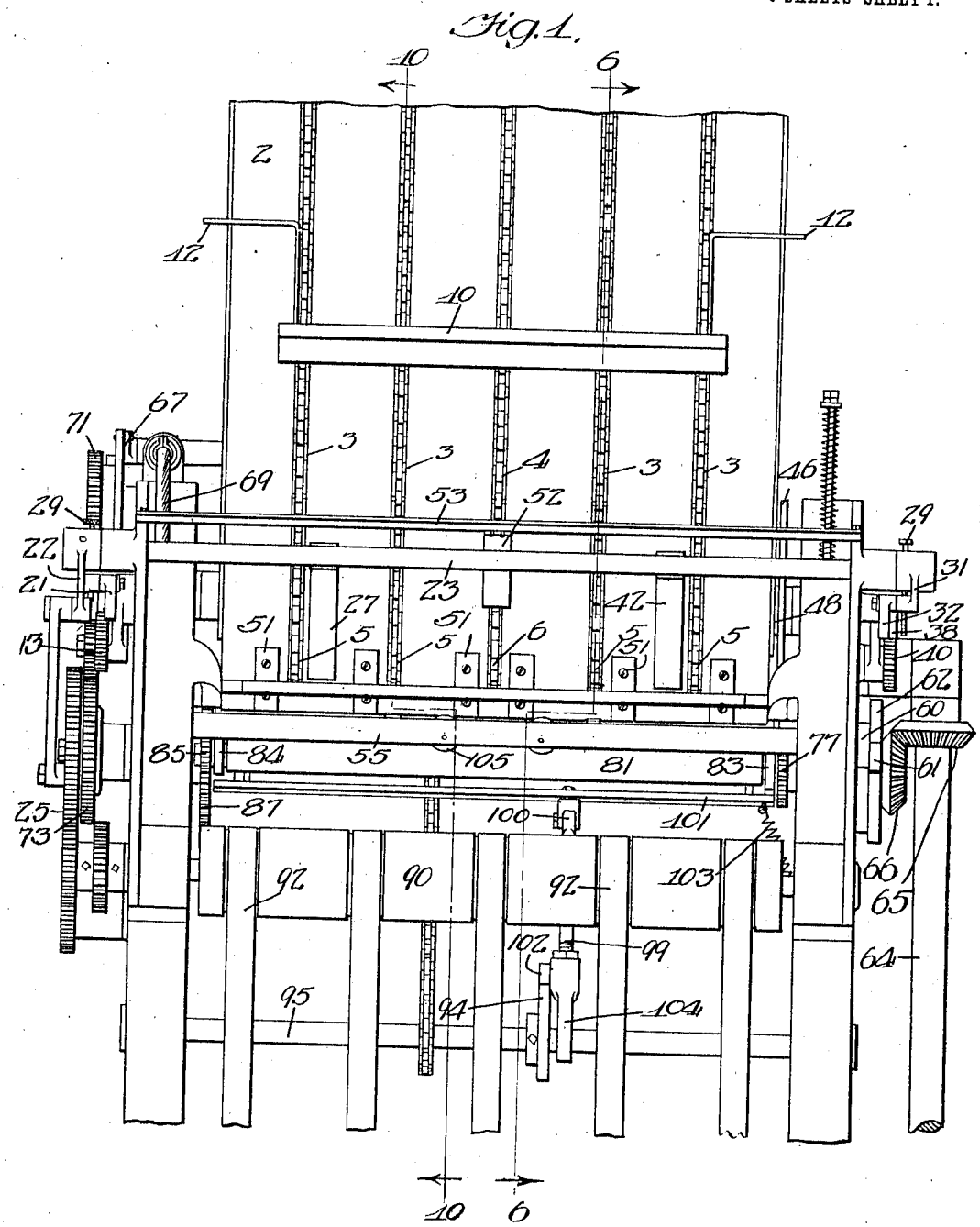

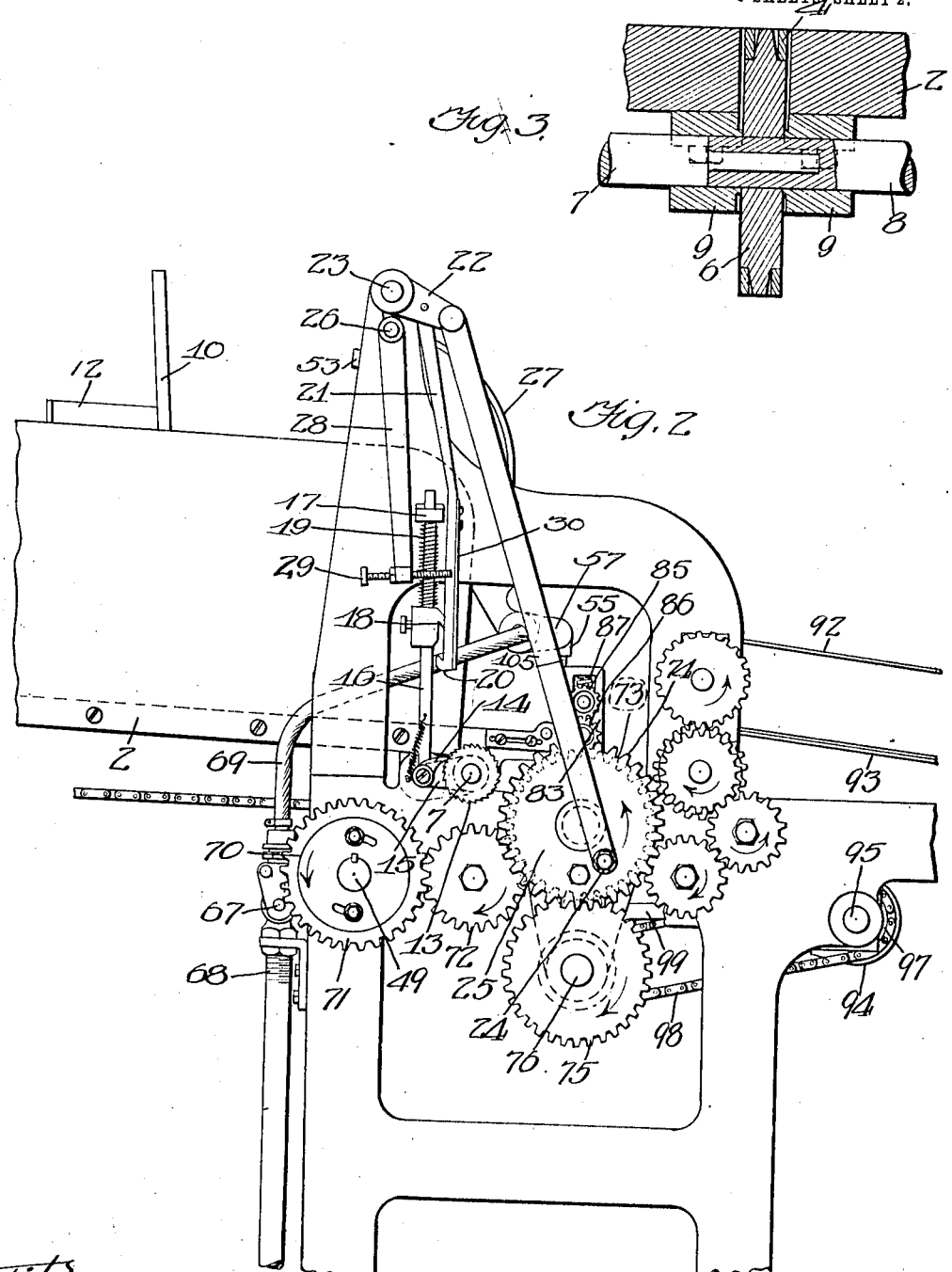

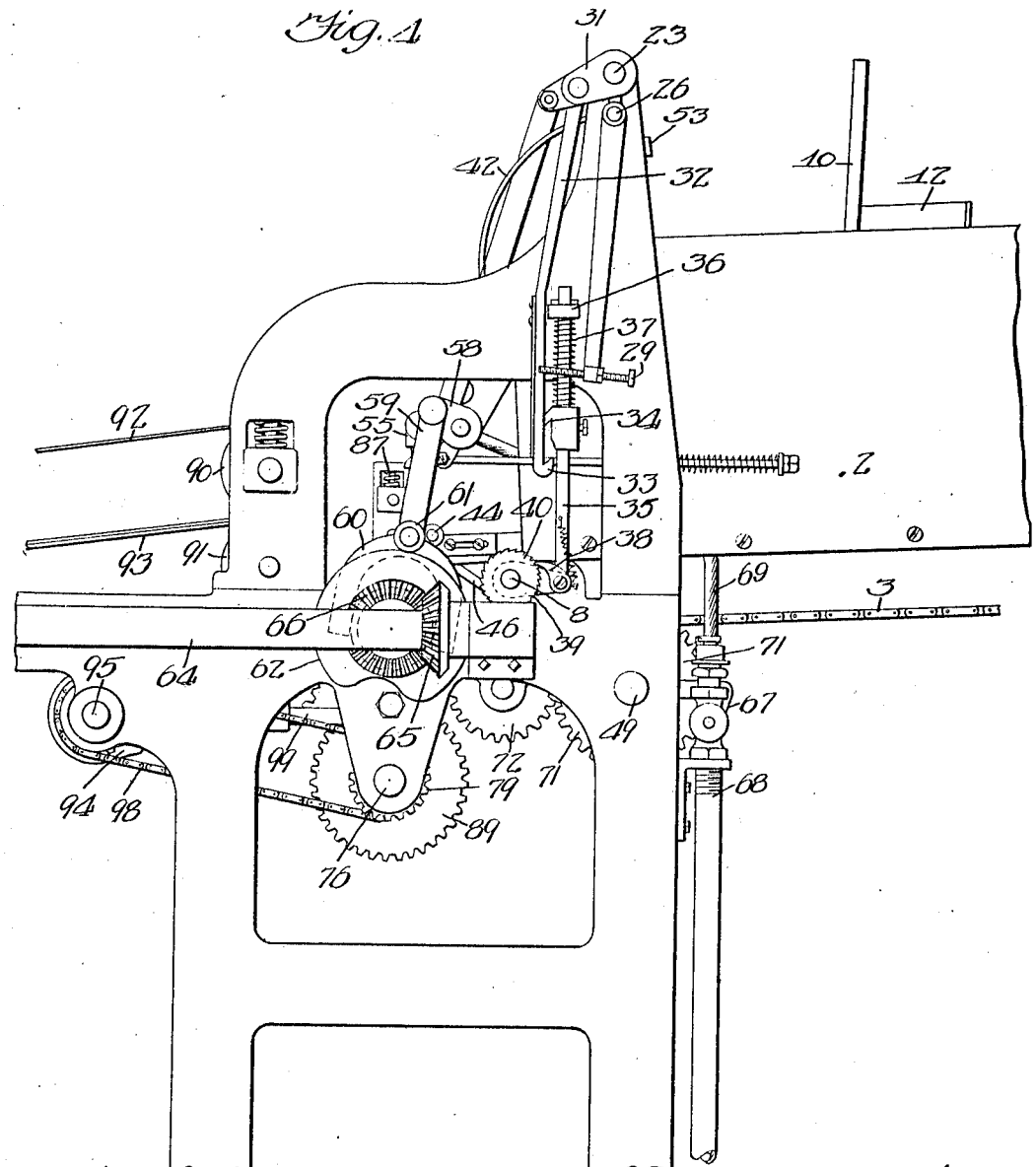

S. C. COX.
PAPER FEEDER.
APPLICATION FILED JUNE 11, 1906. RENEWED JUNE 24, 1912.

1,054,394. Patented Feb. 25, 1913.
9 SHEETS—SHEET 4.

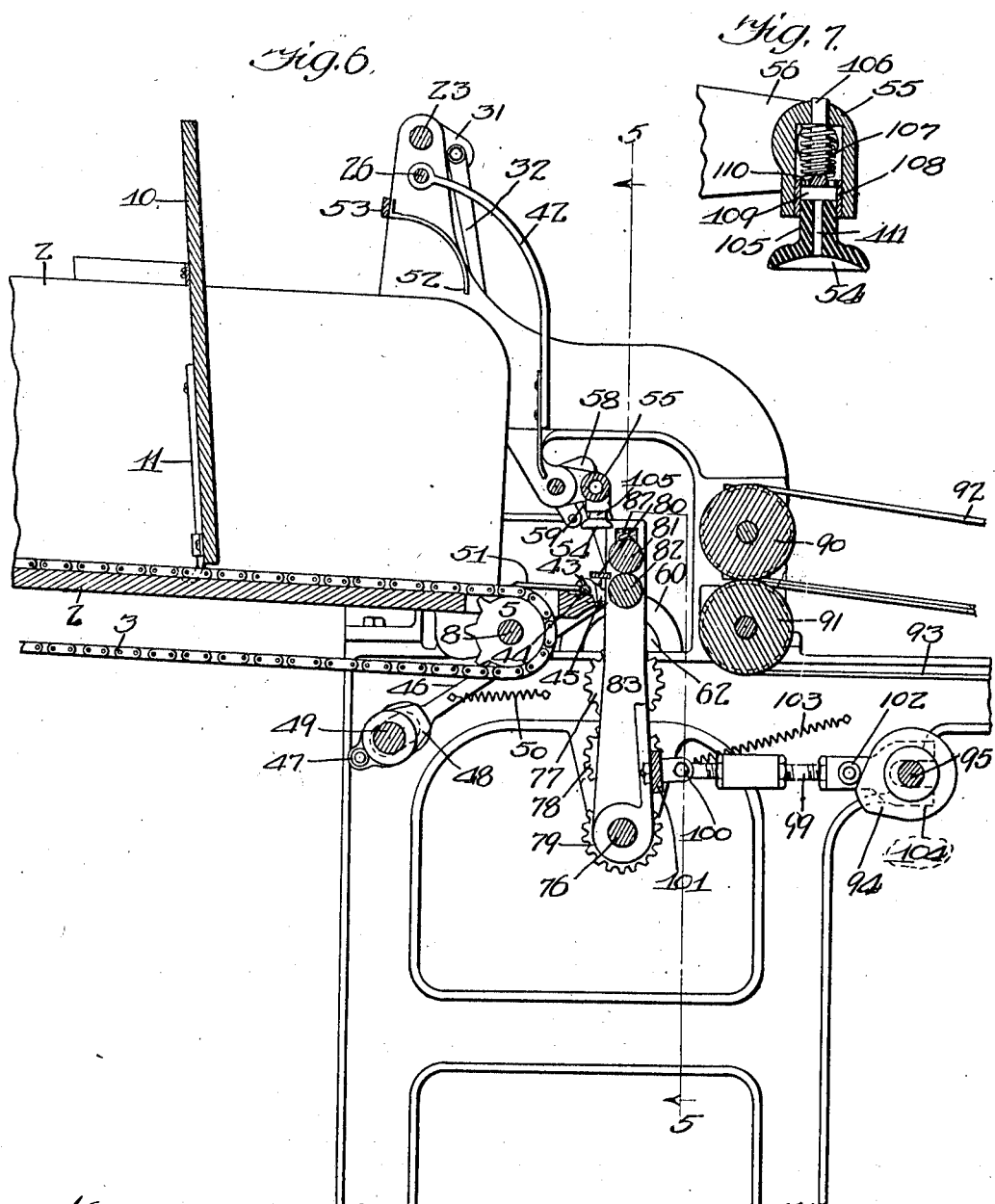

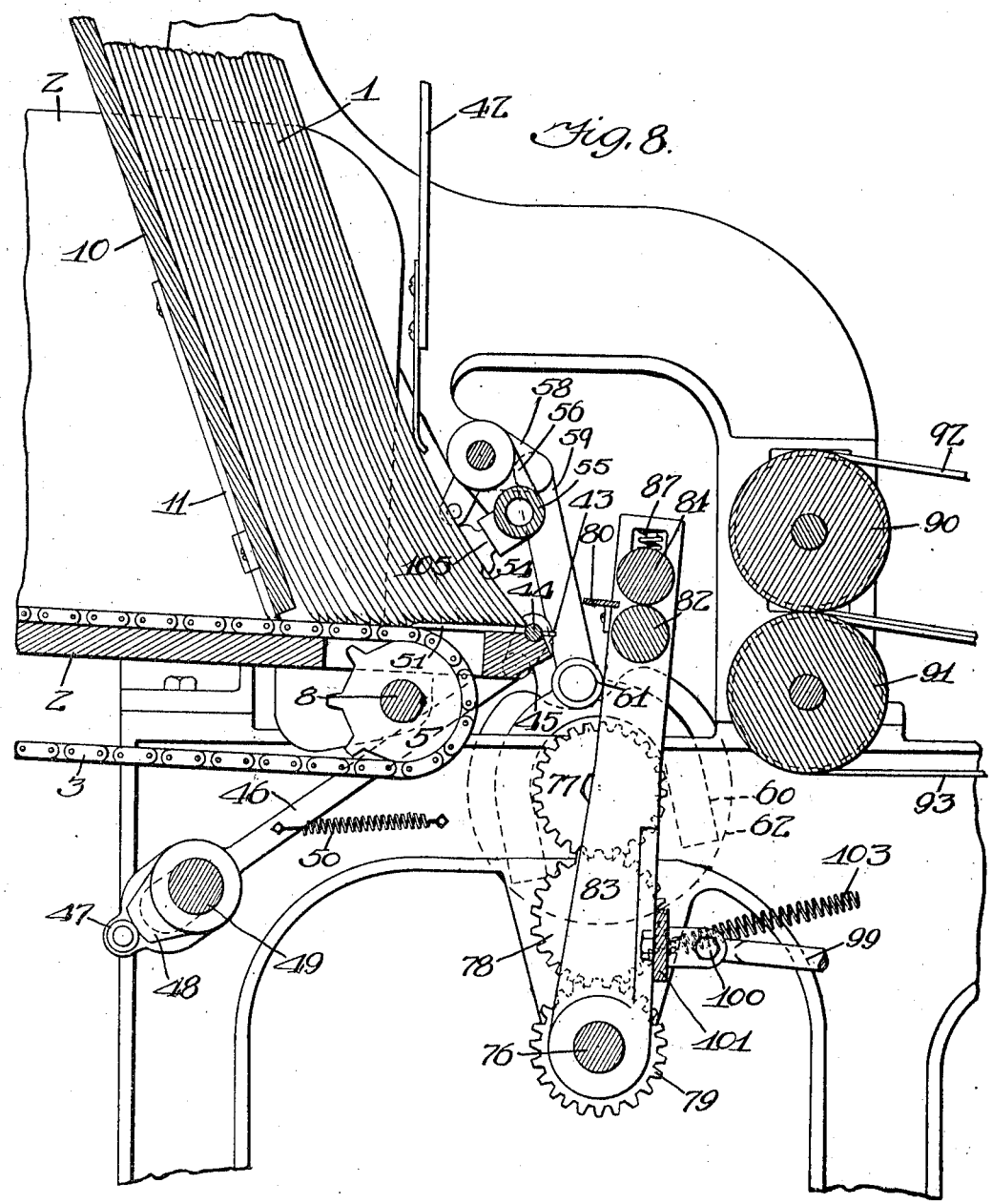

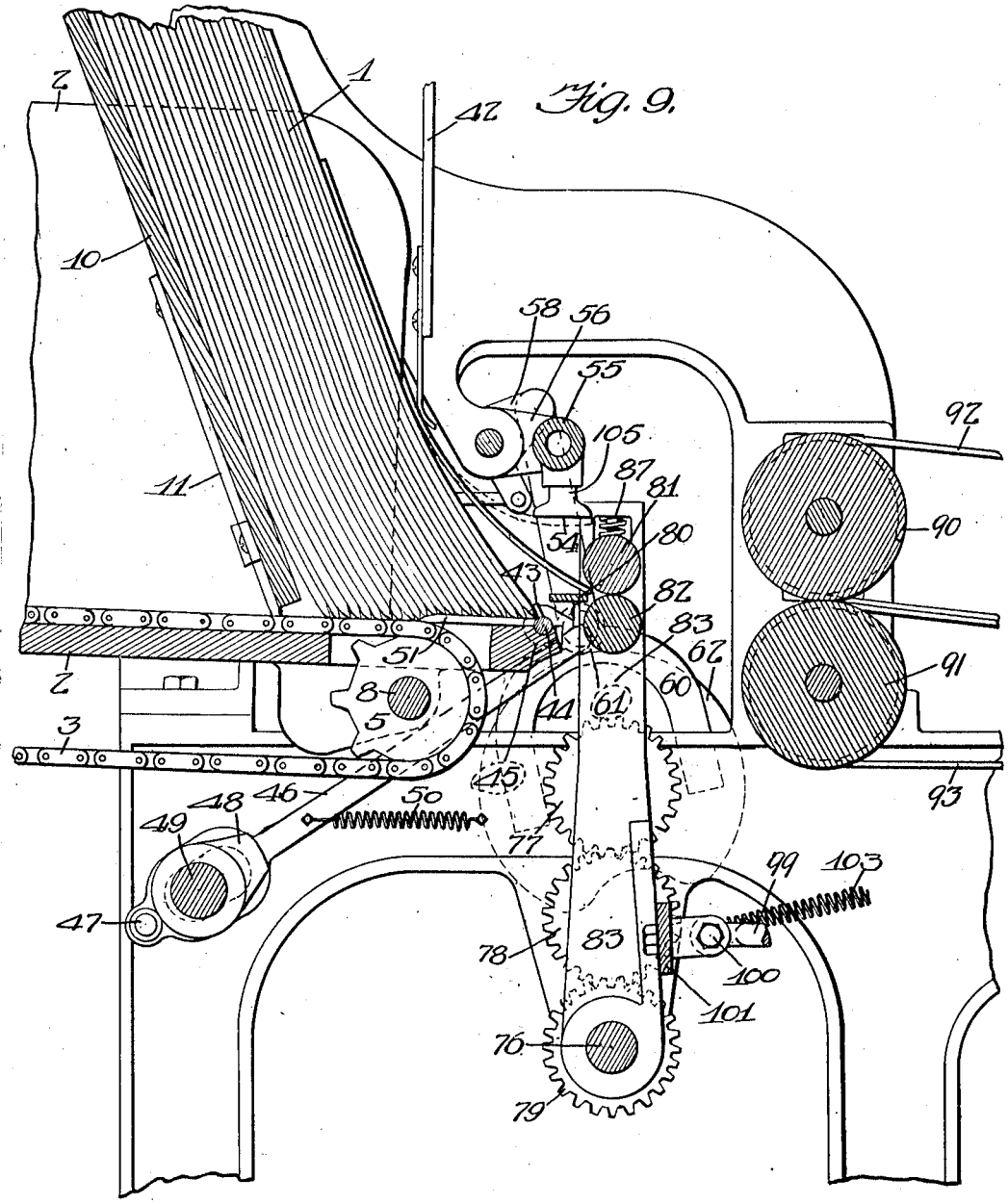

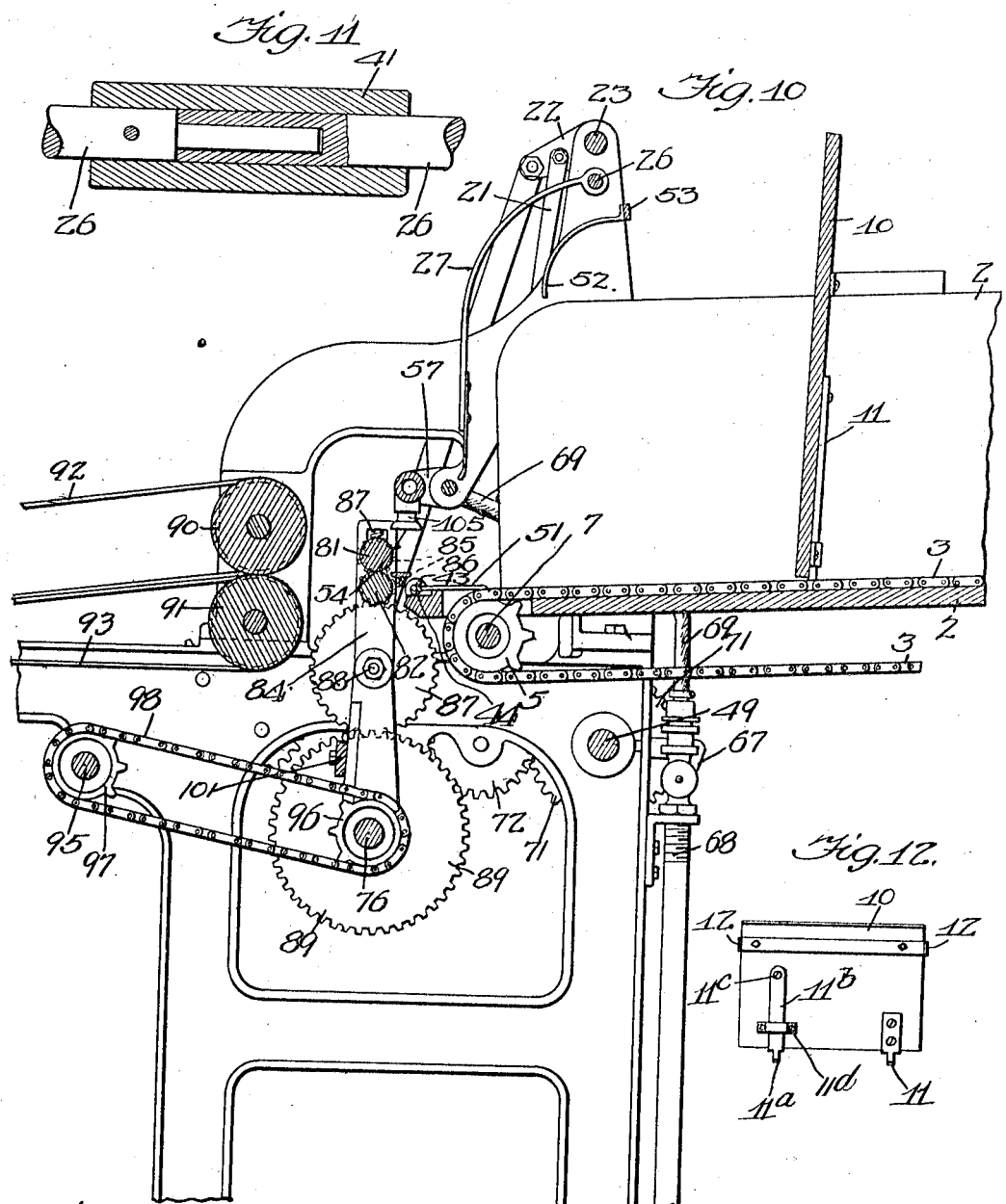

S. C. COX.
PAPER FEEDER.
APPLICATION FILED JUNE 11, 1906. RENEWED JUNE 24, 1912.
1,054,394.
Patented Feb. 25, 1913.
9 SHEETS—SHEET 9.
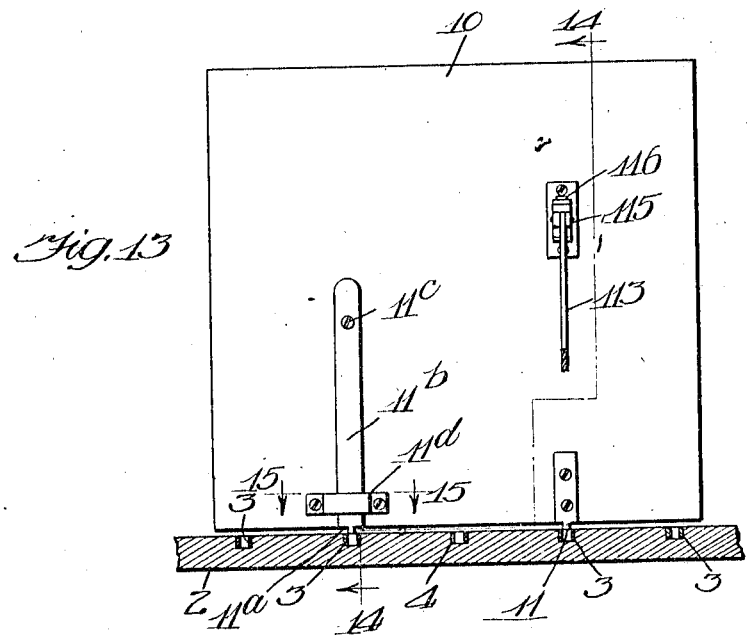
Fig. 13
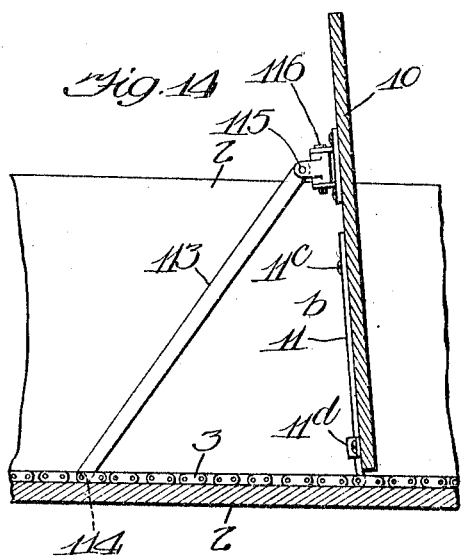
Fig. 14
Fig. 15.
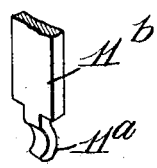
Fig. 16.
Witnesses:
Robert H. Weir
Jno. H. Nelson
Inventor:
S. C. Cox
by Brown Darby & Hopkins
Attys

UNITED STATES PATENT OFFICE.

SANDFORD C. COX, OF EDISON PARK, ILLINOIS, ASSIGNOR TO COX MULTI-MAILER COMPANY, OF AUGUSTA, MAINE, A CORPORATION OF MAINE.

PAPER-FEEDER.

1,054,394. Specification of Letters Patent. Patented Feb. 25, 1913.

Application filed June 11, 1906, Serial No. 321,175. Renewed June 24, 1912. Serial No. 705,641.

*To all whom it may concern:*

Be it known that I, SANDFORD C. COX, a citizen of the United States, residing at Edison Park, in the county of Cook and State of Illinois, have invented certain new and useful Improvements in Paper-Feeders, of which the following is a full, clear, and exact specification.

This invention relates to means for feeding papers and the like to addressing machines or other devices requiring a paper feed, and it has more especial reference to means for feeding newspapers and similar articles which have been folded or partially folded.

The invention has for its primary object to provide an improved and efficient construction of paper feeder of this general description which will extract the papers, one at a time, from a stack or supply and present them in a regular and uniform manner to conveying devices, whereby they may be conducted away to the place or machine where they are subsequently operated upon.

With a view to the attainment of these ends and the accomplishment of certain other objects which will hereinafter appear, the invention consists in the features of novelty in the construction, combination and arrangement of parts, which will now be described with reference to the accompanying drawings, and then more particularly pointed out in the claims.

In the said drawings—Figure 1 is a plan view of a paper feeder embodying this invention. Fig. 2 is a side elevation thereof. Fig. 3 is an enlarged detail sectional view taken longitudinally of a two-part shaft and idle sprocket hereinafter described. Fig. 4 is a side elevation presenting the opposite side to that shown in Fig. 2. Fig. 5 is a vertical transverse section taken on the line 5, 5, Fig. 6. Fig. 6 is a vertical longitudinal section taken on the line 6, 6, Fig. 1. Fig. 7 is an enlarged detail sectional view taken on the line 7, 7, Fig. 5. Fig. 8 is a section taken on the same line as Fig. 6, but on an enlarged scale, showing the papers in position in the hopper with the sucker bar lowered in position to lift the foremost paper. Fig. 9 is a similar section showing the papers in place in the hopper, with the sucker bar raised in the position it assumes just after dropping a paper in position to be conducted away. Fig. 10 is a vertical longitudinal section taken on the line 10, 10, Fig. 1. Fig. 11 is an enlarged detail sectional view taken on the line 11, 11, Fig. 5. Fig. 12 is a detail rear elevation of one of the hooks employed for attaching the follower to the chains. Fig. 13 is a rear elevation of the follower illustrating a modification hereinafter described. Fig. 14 is a sectional view taken on line 14—14 of Fig. 13. Fig. 15 is a detail sectional view on the line 15, 15, Fig. 13. And Fig. 16 is a perspective view of one of the hooks.

In this exemplification of the invention, the papers, which are here illustrated as folded or partially folded newspapers, 1, are placed in a hopper 2, which is preferably arranged in substantially horizontal position, slightly inclined at the discharge end, and in the bottom of which is situated a plurality of feeding belts or chains 3, 4, which may be supported at one end in any suitable way, while their other ends are supported by a corresponding number of sprockets 5, 6, on a cross-shaft, preferably made in two sections 7, 8, arranged end to end, and if desired, partially telescoped, at their meeting ends, as shown in Fig. 3, the sprocket 6 (which is the intermediate one) being idle on the shaft 8, and held between suitable collars or shoulders 9. The chains or belts 3, 4, are situated in suitable channels in the bottom of the hopper, so that their surfaces will be just slightly above the surface of such bottom, and will produce a gentle feeding action against the lower edges of the papers 1 as they rest thereon, throughout the entire supply or pile of papers. The papers are urged forward as a whole, however, by a follower 10, arranged preferably in an inclined position in the hopper 2 for supporting the papers at a corresponding inclination, the lower end of the follower being provided with one or more lugs 11, 11$^a$, engaging between the links of one or more of the chains 3 to give the follower traction, while the upper end of the follower may be supported on the sides of the hopper 2 by means of arms 12, or any other suitable devices. As shown more clearly in Fig. 1, the follower is considerably less in width than the hopper, so as to leave a space at each end, and the arms 12 are carried rearwardly and thence laterally, so that the papers as they rest against the follower will not be severely compressed at their edges. The purpose of this is to avoid undue compression of the entire supply at the ends or edges of the papers where the fold or folds occur, the supply being thickest at these points.

At each side or end of the front face of the supply of papers is situated a means of checking the feeding action of the chains 3 and follower 10 when the foremost paper arrives at a certain point in the line of travel, and the means at one side is entirely independent of that at the other. This is a feature of considerable importance in a machine of this character, especially where it is intended for feeding papers or other articles which are thicker at one side than at the other, or which through any other cause are liable to advance faster at one side than at the other and thereby make the papers feed unevenly from the supply. With the attainment of this end in view, independent means for driving the two shaft sections 7, 8, are also employed.

Referring to Fig. 2, it will be seen that the outer end of the shaft section 7 is provided with a ratchet wheel 13 arranged to be engaged by a pawl 14 mounted on an arm 15 pivoted on the shaft 7, or otherwise made concentric therewith. To this arm 15 is pivoted the lower end of a rod 16, whose upper end is held in place by a suitable guide 17, and which rod also carries a tooth or lug 18, arranged between which and the guide 17 is a coil or other suitable spring 19, adapted to press the rod 16 after it has been elevated. The rod is given an upward movement at the proper time by means of a hook 20 arranged to engage the hook or lug 18, and this hook is carried by an arm 21 pivoted to a rocker-arm 22 on a cross-shaft 23. This rocker-arm 22 receives motion from a crank pin 24 carried by a gear wheel 25, so that at each revolution of the crank pin 24 the pawl 14 will make one stroke and impart a partial rotation to the shaft section 7 and to all of the sprocket wheels 5 carried by that section. To a cross-shaft 26 is secured a trip-finger 27, whose lower end is adapted to be engaged by the foremost one of the papers in the supply 1 when the paper arrives at a predetermined position, and by thus engaging such finger the shaft 26 is rocked and the hook 20 is carried out of line with the lug or hook 18 so as to avoid engagement therewith, by any suitable means, such as an arm 28, carrying an adjusting screw 29 adapted to engage the arm 21, or, more accurately speaking, a flange 30 secured to said arm, the point in the line of travel of the papers at which the hook 20 is thrown out of engaging position with the hook 18 being controlled or regulated by the adjusting screw 29. Now, referring to the opposite side of the machine, shown in Fig. 4, it will be seen that the throw-out mechanism and means for intermittently rotating the other shaft section 8 are substantially duplicated. The shaft 23 at this end carries a rocker-arm 31, which is provided with a pivoted rod or arm 32 having a hook 33 at its lower end arranged to engage a lug or hook 34 on a rod 35 similar to the rod 16. 36 is a guide for rod 35, and 37 a spring corresponding to the guide 17 and spring 19, and 38 is the pawl, and 39 the arm carrying said pawl to cause it to engage ratchet 40, corresponding to ratchet 13, when the hook 33 engages the hook 34. The cross-shaft 26, it will be seen, is made in two sections, joined together at their meeting ends by any suitable means, such as a sleeve 41 pinned to one section and receiving and turning loosely over the other section, the ends of the shaft sections, if desired, being also telescoped together. The trip-finger 27, as before described, is secured to one of these sections, while to the other is secured a similar trip-finger 42 arranged to be engaged by the foremost paper, but at the farther side of the pile or supply, and as a consequence, the throw-out mechanism on one side will operate independently of that on the other, and the feed chains 3 on one side will continue their feeding action until that side is as far advanced as the other side, with the result that the feed of the supply will be maintained absolutely uniform, with the lower edge of the foremost paper always at substantially right-angles to the line of travel of the supply, where its forward movement is limited by a stop in the form of one or more lips or fingers 43 arranged on a transverse rocker-shaft 44, in such a position that the rocker-shaft can turn in one direction to cause the stop 43 to engage and detain the lower edge of the paper, as shown in Fig. 9, and when turned in the opposite direction, as shown in Fig. 8, will release the paper and permit it to pass. This rocking action of the shaft 44 is induced by a rocker-arm 45, pivoted to the upper end of a rod 46, whose lower end carries an anti-friction roller 47, arranged to be engaged by a cam 48 on a cross-shaft 49, the rod 46 being moved in the opposite direction by any suitable means, such as a spring 50. In order that the elasticity of the supply of papers may not induce an undue forward movement of the entire supply when the stop 43 is withdrawn, it is desirable to arrange in the bottom of the hopper 2 one or more retarding shoulders 51, against which the lower edges of the papers engage at a short distance from the stop 43, so as to hold back the main body of the supply, leaving only a few papers free to advance along the level surfaces of the bars on which the shoulders 51 are produced. The upper edge of the pile may be restrained, if desired, by a yielding stop 52 carried by a cross-rod 53. At or about the time that the stop 43 is withdrawn the foremost paper, near the lower edge thereof, is engaged and lifted by one or more suckers 54, of any suitable form, carried on an oscillating sucker-bar 55, which extends across the supply of papers and is carried by rocker-arms 56, 57, one of which is provided with a crank arm 58, operatively connected by a stem 59 to a yoke 60, carrying an anti-friction roller 61, arranged to be engaged by a cam 62 on a stud-shaft 63, which receives motion from a driving-shaft 64 having bevel-pinion 65 engaging bevel-pinion 66 on shaft 63, the cam 62 being so fashioned and timed with relation to the cam 48 that the suckers 54 will engage the paper at or about the time the latter is released by the stop 43, and will thereafter lift the paper into the position shown in dotted lines in Fig. 9, the cam 48 permitting the stop 43 to return to its former position to arrest the next paper as soon as the lower edge of the foremost paper is safely out of the way. After the paper has been thus lifted the vacuum under the sucker 54 is broken, by any suitable automatic means, such as a valve 67, which is arranged in the pipe 68 connected with the sucker bar 55 by a flexible tube 69, or other suitable means, the valve 67 being thrown open to permit the air to enter the pipe 69 at the proper time, by a suitable cam 70 operatively connected with a gear wheel 71 on the shaft 49, this gear wheel being driven by idler 72 meshing with a gear 73 on the back of gear 74, which meshes with gear 75 on a shaft 76, receiving motion from the stud-shaft 63 by an upright train of gears 77, 78, 79, (see Fig. 5). The valves 67 may be returned or operated in opposition to the cam 70 in any desired manner, such, for instance, as a spring, which may be arranged around the valve stem and which is not shown. When the vacuum is thus broken the lower edge of the paper falls upon a rest 80. This rest serves as a guide for directing the edge of the paper in between a pair of feeding rolls 81, 82, which are carried back and forth or toward and from the supply of papers, together with the rest 80, by a pair of upright oscillatory arms 83, 84, upon which the rest 80 is also supported. These rolls 81, 82, are geared together or otherwise operatively connected by spur-gears 85, 86, and the upper one is pressed yieldingly against the lower one by suitable springs 87ª, so as to grip the papers with sufficient force and yet yield with their varying thicknesses. Operative rotation is imparted to the lower roll 82 by an idler 87 mounted on a stud 88 carried by arm 84, and this idler meshes with a gear 89 mounted on shaft 76, which constitutes the center of oscillation and support for the arms 83, 84. Consequently, the rolls 81, 82, are rotated together in a direction at their meeting faces away from the supply of papers in all positions of the arms 83, 84, and are thereby made to serve for the purpose of gripping the edge of the paper dropped by the suckers, and conducting the same to and introducing it between a pair of fixed feed rolls 90, 91, which are stationary with relation to the supporting frame and are provided with tapes 92, 93, respectively, for conducting the sheet or paper to the machine or place where it is to be subsequently operated upon or received. These rolls preferably receive motion from the gear 25 through the medium of a train of gears shown more clearly in Fig. 2. The arms 83, 84, are loose upon the shaft 76, and are given the desired oscillation by means of a cam 94 mounted upon a shaft 95, which receives rotation from the shaft 76 through the intermediary of two sprockets 96, 97, and a chain-belt 98, the cam 94 acting upon a connecting rod 99, which is pivoted at 100 to a cross-bar 101 connecting the arms 83, 84, together, the outer end of the rod being provided with an anti-friction roller 102, held in contact with the surface of the cam 94 by any suitable means, such as a spring 103, this end of the arm being supported by a fork 104 on shaft 95. In order that the suckers 54 may adapt themselves to irregularities in the surface of the paper against which they come in contact, and thus avoid the possibility of one sucker being held out of contact and thereby breaking the vacuum, they are made as shown in detail in Fig. 7, from which it is seen that each is provided with a stem comprising an enlarged portion 105 and a reduced portion 106, the enlarged portion projecting into the lower side of the bar 55, and the reduced portion through the upper side, and between the top of the cavity of the bar and the enlarged portion of the stem is located a spring 107, which serves to press the sucker outward, while permitting it to yield to irregularities, as before mentioned. It being desirable to make the sucker proper of rubber or similar yielding substance, the rubber portion of the stem, for the sake of durability, is held by a ferrule or sheath 108, in which suitable passages 109, 110, are formed, and communicate with passage 111 in the rubber portion for placing the interior of the bar in communication with the atmosphere.

It is preferable to attach the follower 10 to the chains on both sides of the hopper, so that the ends of the follower will be controlled, respectively, by the two independent feeding mechanisms, and will be urged forward or allowed to rest, according to the requirements of the machine. The intermediate chain being an idler, serving merely as an anti-friction support for the supply of papers at the intermediate part thereof, is not utilized for advancing the follower, which is preferably attached to the outer chains by the lugs 11, 11ᵃ, as before described. It is obvious, of course, that when one side or end of the follower advances with respect to the other, the distance between the points of attachment of the follower with the chains necessarily increases, and to the end that this may occur without unduly binding or cramping the chains, the lug 11ᵃ is movable laterally, it being formed on the lower end of an arm 11ᵇ pivoted at 11ᶜ to the back of the hopper, and held in place, with capability of limited movement, by a suitable keeper 11ᵈ.

In the modification shown in Figs. 13 to 16, the arms 12 for supporting the upper end of the follower are dispensed with, and in lieu thereof is employed a brace 113, which is formed with a hook 114 or other suitable means, at its lower end, whereby it may engage with one of the chains 3 for serving as a prop or brace to keep the follower at the proper degree of inclination. The upper end of this brace has pivotal or universal connection with the follower by means of a horizontal pivot 115, and another pivot 116 extending substantially at right-angles to the first pivot, so that the ends of the follower may go and come, so to speak, without interfering with the engagement of the brace with the chains, and the follower may be set at various angles of inclination to suit the angle of inclination at which it is desired to store the papers in the hopper. This also permits the brace to be folded against the back of the follower, and the follower lowered to a more or less horizontal position when being engaged with the chains.

I claim:

1. In a machine for the purpose described, the combination of means for holding a supply of papers or sheets, independent feed-belts upon which the supply rests, means for moving said belts in the feeding direction independently, means for extracting the papers from the supply, and means controlled by the feeding movement of the papers for throwing said feeding-belts out of action independently.

2. In a machine for the purpose described, the combination of means for holding a supply of papers or sheets, oscillatory rotating feed rolls moving toward and from said feed supply, and means supported independently of and operatively related to said feed rolls for presenting the edge of the foremost sheet thereto.

3. In a machine for the purpose described, the combination of means for holding a supply of papers or sheets, oscillatory rotating feed rolls movable toward and from said supply, and means supported independently of and operatively related to said feed rolls for picking up the lower edge of the foremost paper and dropping it within the grasp of the feed rolls when adjacent to the supply.

4. In a machine for the purpose described, the combination of means for holding a supply of papers or sheets, oscillatory feed rolls movable toward and from the supply, a rest for the paper adjacent to said feed rolls, and means for dropping the edge of the foremost paper upon said rest.

5. In a machine for the purpose described, the combination of means for holding a supply of papers or sheets, oscillatory feed rolls movable toward and from said supply, a rest arranged adjacent to said feed rolls and movable back and forth therewith, and means for picking up the foremost paper from the supply and dropping the edge thereof upon said rest.

6. In a machine for the purpose described, the combination of means for holding a supply of papers or sheets, oscillatory rotating feed rolls movable toward and from said supply, means supported independently of the feed rolls for picking up the foremost paper and presenting the edge thereof to said feed rolls, and means operatively related to said picking-up means for rotating the feed rolls.

7. In a machine for the purpose described, the combination of means for holding a supply of papers or sheets, oscillatory rotating feed rolls movable toward and from said supply, vibratory arms in which said feed rolls are journaled, gearing concentric with the center of oscillation of said arms for driving said feed rolls, and means timed with reference to the movement of said arms for presenting the foremost paper of the supply to said feed rolls.

8. In a machine for the purpose described, the combination of means for holding a supply of papers or sheets on edge, fixed means for conducting away the papers or sheets after they are extracted from said supply, oscillatory rotating feed rolls movable back and forth between the supply and the said conducting-away means, and means for presenting the edge of the foremost paper of the supply to said feed rolls.

9. In a machine for the purpose described, the combination of means for holding a supply of papers or sheets, feed rolls for conducting away the papers as they are extracted from said supply, oscillatory feed rolls movable back and forth between said supply and the first said rolls, a rest movable back and forth with the oscillatory rolls and arranged contiguous to their adjacent faces, means for extracting the edge of the foremost paper from the supply and placing it upon said rest, and means for oscillating said oscillatory feed rolls, operatively connected with said extracting means.

10. In a machine for the purpose described, the combination of means for holding a supply of papers or sheets, oscillatory arms, feed rolls mounted in said arms and movable toward and from said supply, a paper rest carried by said arms contiguous to the adjacent sides of said feed rolls and disposed between the feed rolls and supply, means for dropping the papers upon said rest, and means for oscillating said arms in time with said dropping means.

11. In a machine for the purpose described, the combination of means for holding a supply of papers or sheets, an oscillatory sucker-bar, a plurality of suckers having stems projecting laterally into said bar, each of said stems having a reduced portion projecting through one side of the bar and an enlarged portion projecting through the other side, and the enlarged portion having passages leading to the atmosphere, springs arranged within the bar on said reduced portions for cushioning the stems against inward movement, and means for oscillating the bar to cause it to move toward and from the supply.

12. In a machine for the purpose described, the combination of means for holding a supply of papers or sheets, independent means for feeding the supply forward at different sides thereof independently, and a follower connected with both of said feeding means, whereby its ends will advance independently.

13. In a machine for the purpose described, the combination of means for holding a supply of sheets or papers, independent means for feeding the supply forward at different sides thereof independently, a follower, and yielding means connecting the follower with both of said feeding means, whereby the ends of the follower may advance independently.

14. In a machine for the purpose described, the combination of means for holding a supply of papers or sheets, independent means for feeding the supply forward at different sides thereof, a follower having attachment with one of said feeding means for causing it to advance therewith, and a laterally-yielding lug, also attaching said follower to the other feeding means.

15. In a machine for the purpose described, the combination of means for holding a supply of papers or sheets, independent means for feeding the supply forward at different sides thereof independently, a follower connected with both of said feeding means, a brace having yielding connection with the follower and adapted to be engaged by one of said feeding means for holding the upper edge of the follower in position, while permitting it to move at different sides independently.

16. In a machine for the purpose described, the combination of means for holding a supply of papers or sheets, independent means for feeding the supply forward at different sides thereof independently, a follower connected with both of said feeding means, a brace engaging one of said feeding means at its lower end, and a universal joint connecting the other end thereof with the upper part of the follower.

17. In a machine for the purpose described the combination of means for holding a supply of papers or sheets on edge, oscillatory feed rolls movable toward and from said supply, means for picking up the lower edge of the foremost paper and presenting the edge to the feed rolls and means for operating the last said means.

18. In a machine for the purpose described the combination of means for holding a supply of papers or sheets on edge, oscillatory rotating feed rolls movable toward and from said supply, means for picking up the lower edge of the foremost paper and presenting it between the rotating feed rolls and means for operating the last said means.

19. In a machine for the purpose described the combination of means for holding a supply of papers or sheets on edge, oscillatory rotating feed rolls movable toward and from said supply, means for picking up the lower edge of the foremost paper and placing it in a position to be gripped by the rolls, means for holding the paper in such position, and means for operating the said picking-up means.

20. In a machine for the purpose described, the combination of means for holding a supply of paper or sheets, oscillatory rotating feed rolls moving to and from said feed supply, and means separate from the paper holding means and supported independently of the feed rolls, and operatively related to the said feed rolls for presenting the edge of the foremost sheet thereto.

21. In a machine for the purpose described, the combination of fixed means for holding a supply of papers or sheets, fixed means for conducting away the papers or sheets after they are extracted from the said supply, oscillatory rotating feed rolls movable back and forth between the supply and the said conducting away means, and means separate from and supported independently of the feed rolls for presenting the edge of the foremost paper of the supply to the said feed rolls.

22. In a machine for the purpose described, the combination of fixed means for holding a supply of papers or sheets on edge, fixed means for conducting away the papers or sheets after they are extracted from the said supply, oscillatory rotating feed rolls movable back and forth between the supply and the said conducting away means, and means separate from the said holding means for presenting the edge of the foremost paper of the supply to the feed rolls.

In testimony whereof I have signed my name to this specification, in the presence of two subscribing witnesses, on this 31st day of May, A. D. 1906.

SANDFORD C. COX.

Witnesses:
EDWARD H. SANFORD,
J. TOMLINSON.

Copies of this patent may be obtained for five cents each, by addressing the "Commissioner of Patents, Washington, D. C."